United States Patent
Lin et al.

(10) Patent No.: US 7,599,525 B2
(45) Date of Patent: Oct. 6, 2009

(54) IMAGE PASSWORD LOCK SYSTEM BY TRACING POSITION INFORMATION OF THE ORGANISM OR ARTICLE FEATURE

(75) Inventors: Chern-Sheng Lin, Taichung (TW); Mau-Shiun Yeh, Chiayi (TW); Cheng-Feng You, Taipei (TW); Chun-Chiang Wang, Kaohsiung (TW); Ten-Ken Lin, Taichung County (TW)

(73) Assignee: Industrial Technology Research Institute, Hsinchu (TW)

( * ) Notice: Subject to any disclaimer, the term of this patent is extended or adjusted under 35 U.S.C. 154(b) by 828 days.

(21) Appl. No.: 11/205,145

(22) Filed: Aug. 17, 2005

(65) Prior Publication Data

US 2007/0041621 A1    Feb. 22, 2007

(51) Int. Cl.
    *G06K 9/00* (2006.01)
(52) U.S. Cl. ..................................... 382/117
(58) Field of Classification Search ........................ None
    See application file for complete search history.

(56) References Cited

U.S. PATENT DOCUMENTS 6,850,631 B1 * 2/2005 Oda et al. .................... 382/117
7,346,195 B2 * 3/2008 Lauper et al. ............... 382/117

* cited by examiner

*Primary Examiner*—Brian P Werner
*Assistant Examiner*—Elisa M Rice
(74) *Attorney, Agent, or Firm*—Harness, Dickey & Pierce, P.L.C.

(57) ABSTRACT

An image password lock system by tracing the position information of the organism or article feature is provided. In this embodiment, a photographic device photographs a movable target object to read a dynamic image data. Moreover, the dynamic image data has a predetermined shooting range set to be a whole-region image, and the whole-region image has a central region and a plurality of specific password regions. A target object image is displayed by a display device, and then processed by an image processing device, thereby calculating a center coordinate point of the target object image in the dynamic image data, compiling a password constituted by a movement position of the target object image, displaying the password, and validating the password. Therefore, benefits of a novel password input mode without any contact, an efficient anti-theft function and the like are provided.

15 Claims, 7 Drawing Sheets

IMAGE PASSWORD LOCK SYSTEM BY TRACING POSITION INFORMATION OF THE ORGANISM OR ARTICLE FEATURE

BACKGROUND

1. Field of Invention

The present invention relates to a password lock system, and in particular, to an image password lock system, which can provide the benefits of a novel password input mode without any contact, an efficient anti-theft function and the like.

2. Related Art

For the traditional lock forms, most of locks are unlocked by inputting password manually, contacting with an identification magnetic card or using a handheld key and the like.

To sum up, the locks have the following drawbacks regardless of which forms they are taking:

(1) Unavoidable contact direct or indirect with the locks. Whether the conventional devices are unlocked by inputting password manually, contacting the 'handheld' identification with the magnetic card machine or using the 'handheld' key, it is inevitable to contact directly or indirectly with the locks by hand, thus increasing the infection risk of the epidemic disease. For people who have documents in hands or are busy with working, they have to leave the related documents or their business aside to enter the password so as to undo the lock, which, in the era where the video technology prevails, is rather inconvenient.

(2) Inconvenient and invalidation-prone password input mode. If the existing digital password is mostly input by keyboard, it becomes rather an obstacle for the limb-handicapped, while if it is input by voice; it is easily invalidated since it may be overheard by others, which are drawbacks for the commonly used and relatively convenient digital and voice passwords.

(3) Deficient anti-theft performance. The commonly used and relatively convenient voice password is easily invalidated since it may be overheard by others while being input by voice; while the digital password is limited by the password length of the number or text input, so it is easy to be decoded through the quick combinational arithmetic on computers by the ill-intentioned people, which results in a deficient anti-theft performance.

SUMMARY

In view of the foregoing, an objective of the invention is to provide an image password lock system by tracing the position information of the organism or article feature, which is provided with a password input mode without any contact, and thus the infection risk of the disease is avoided, and it is also convenient for the limb-handicapped to input the passwords.

Another object of the invention is to provide an image password lock system by tracing the position information of the organism or article feature, which takes the image tracing of the positions of the organism or article feature as the basis of password input, and is quite novel.

Yet another object of the invention is to provide an image password lock system by tracing the position information of the organism or article feature, which has an effective anti-theft function.

To achieve the above objectives, the invention provides an image password lock system by tracing the position information of the organism or article feature, which comprises: a photographic device, to photograph a movable target object to read a dynamic image data, a predetermined shooting range of the dynamic image data being set to be a whole-region image; wherein the target object corresponds to a target object image, and the whole-region image has a central region and a plurality of specific password regions; a display device; an image processing device, including: (a) a calculation module of the center point of the target object, for calculating the coordinate of the center point of the target object image in the dynamic image data; (b) a validation module of the target object movement, for outputting a password corresponding to a specific password region, when the center point of the target object image moves toward the specific password region from the central region and then back to the central region again; (c) a password display module, for displaying the password output on the display device; and a password validation device, for comparing whether the password is the same as the correct one predetermined, and outputting a password-correct action if they are the same.

BRIEF DESCRIPTION OF THE DRAWINGS

The invention will become more fully understood from the detailed description given herein below illustration only, and thus are not limitative of the present invention, and wherein.

DETAILED DESCRIPTION OF THE INVENTION

Figure 1:
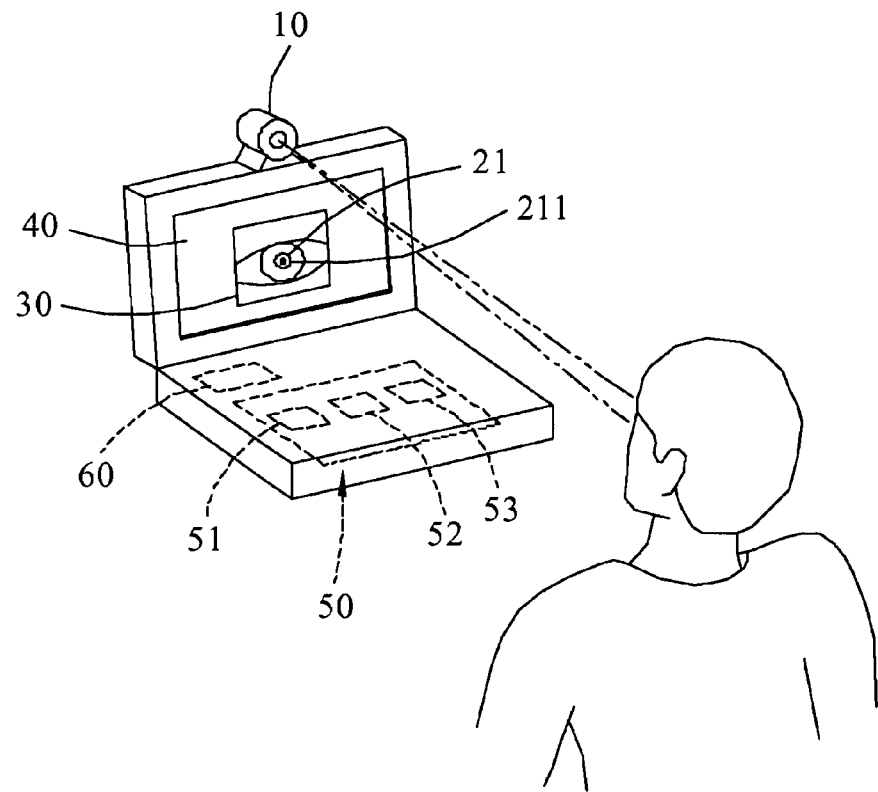
FIG. 1 is a schematic view of the architecture of the system in accordance with the invention.
Figure 2:
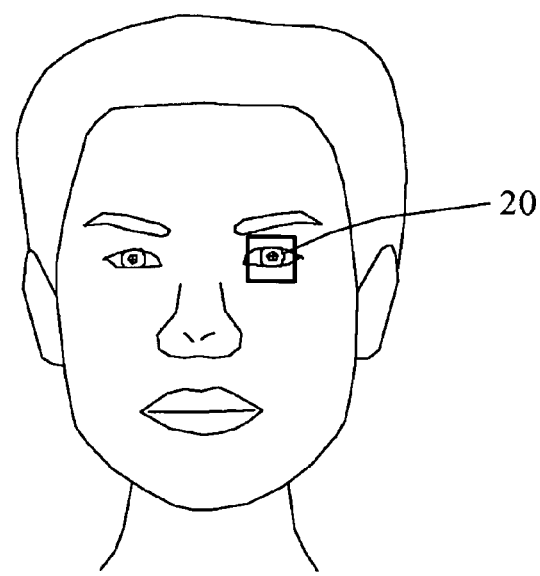
FIG. 2 is a schematic view of the invention with the human eye as a target object.
Figure 3:
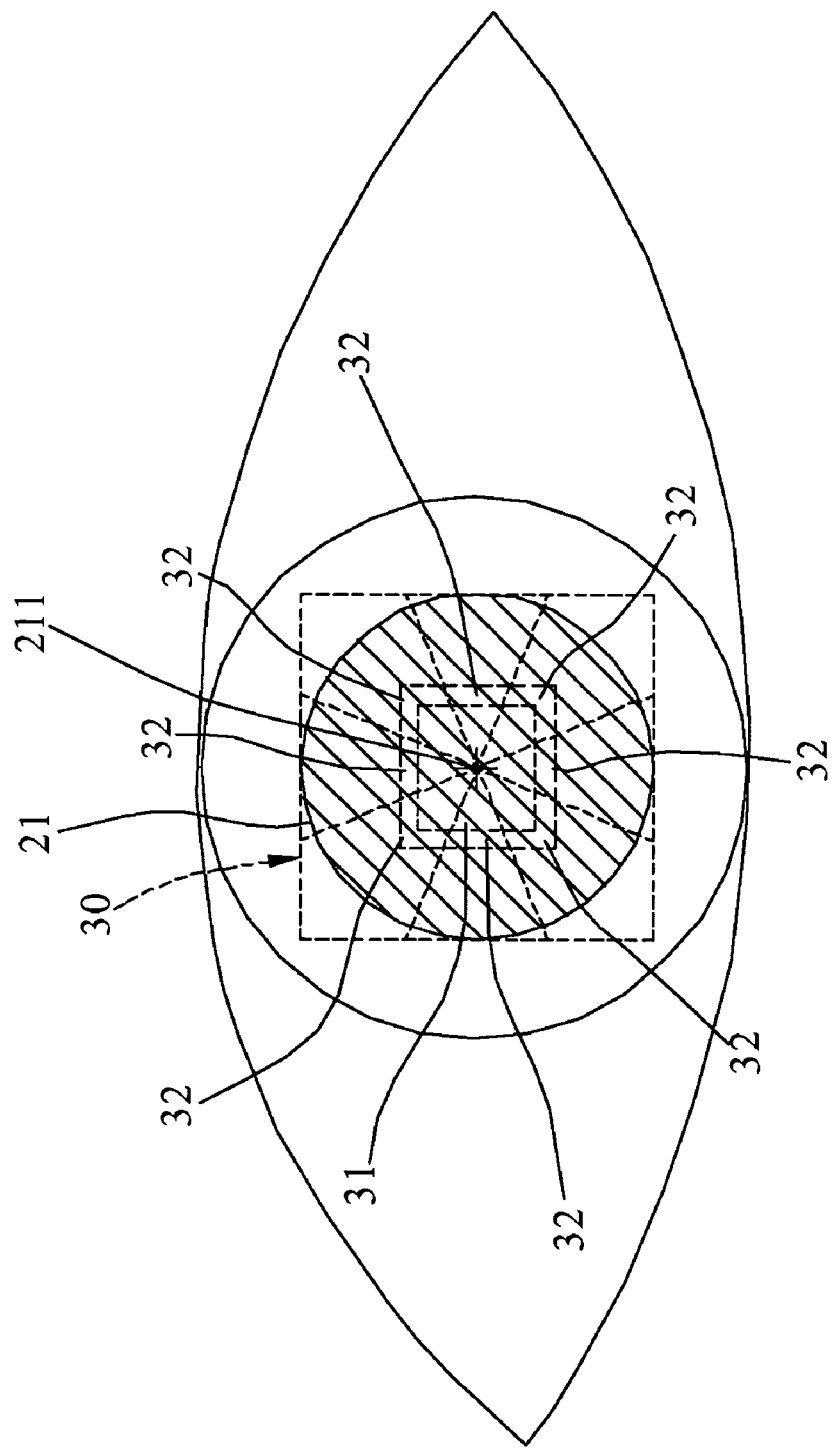
FIG. 3 is a schematic view of the whole-region image in accordance with the invention.
Figure 4:
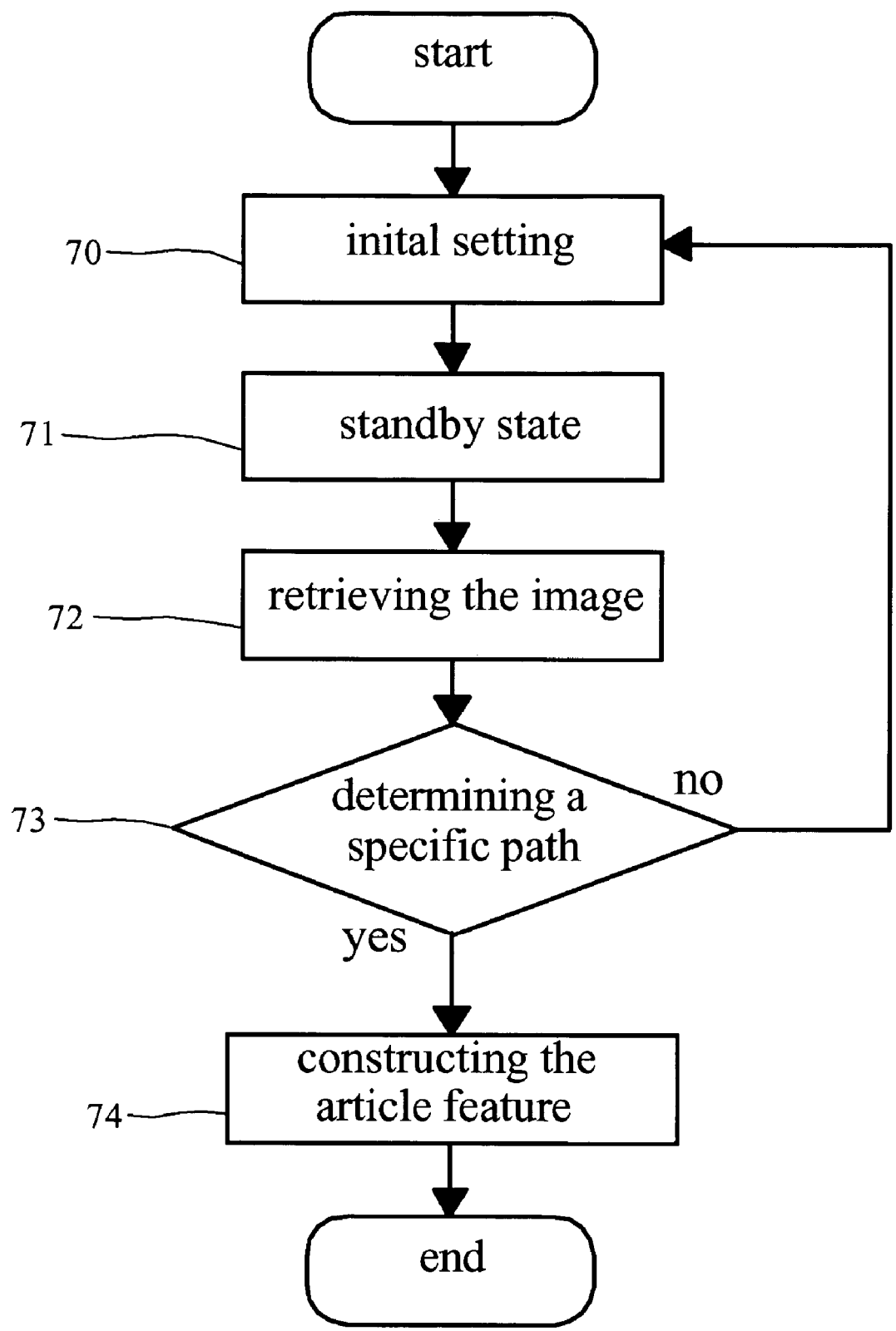
FIG. 4 is an operation flow chart set by the system in accordance with the invention.

Referring to FIG. 1 to FIG. 3, the present invention provides an image password lock system by tracing the position information of the organism or article feature, which primarily includes: a photographic device 10, a display device 40, an image processing device 50, and a password validation device 60.

The photographic device 10 is a photographic chip having at least one Charge Coupled Device (CCD) and is used to photograph a movable target object 20 to read a dynamic image date (a pupil image in a preferred embodiment of the invention), wherein the up/down direction and the left/right moving direction of the dynamic image data are identical with that of the user. A predetermined shooting range of the dynamic image data is set to be a whole-region image 30. The target object 20 corresponds to a target object image 21, and the whole-region image 30 has a central region 31 and a plurality of specific password regions 32.

The display device 40 is a screen of a notebook computer, a personal digital assistant, a mobile phone or a desktop computer.

As for the image-processing device 50, it includes at least:

(a) a calculation module 51 of the center point of the target object, for calculating the coordinate of the center point 211 of the target object image 21 in the dynamic image data;

(b) a validation module 52 of the target object movement, for outputting a password corresponding to the specific password region 32, when the center point 211 of the target object image 21 moves toward a certain password region 32 from the central region 31 and back to the central region 31 again; and (c) a password display module 53, for displaying the password output on the display device 40.

In this embodiment, the number of the specific password regions 32 is set to eight, respectively located above, top right of, right of, bottom right of, below, bottom left of, left of, top left of the central region 31, represented by 1, 2, 3, 4, 5, 6, 7, 8 respectively; when the center point 211 of the target object image 21 moves toward but still away from a specific password region 32, the validation module 52 of the target object movement outputs a warning action to indicate that the specific password region 32 has not been reached.

Further, the password validation device 60 is used for comparing whether the password is the same as the correct one predetermined, and outputting a password-correct action if they are the same.

Figure 8:
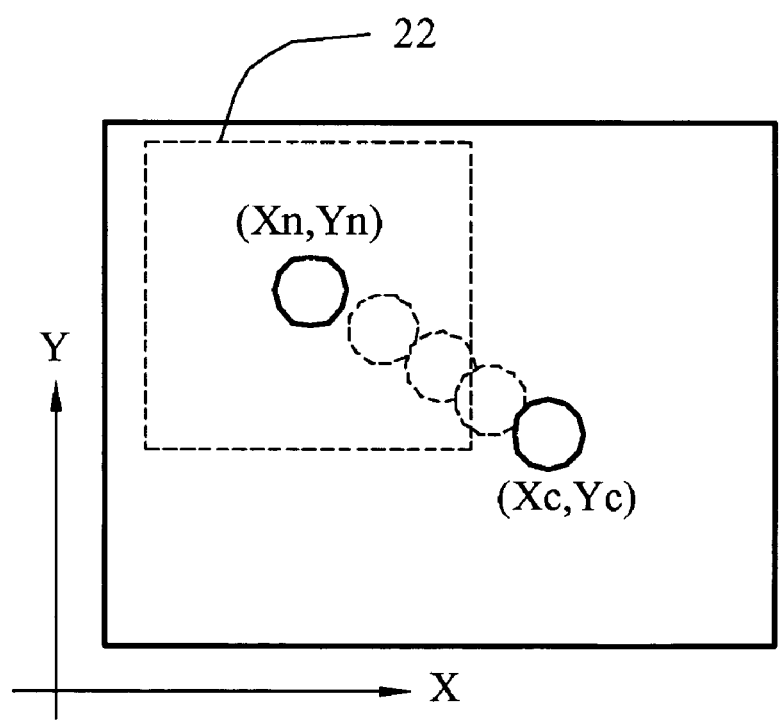
FIG. 8 is a schematic view of the calculation of the dynamic image search principle in accordance with the invention.

The operation flow set by the system is shown as in FIG. 8. The initial setting of the system is to shield the photographic lens with hands (step 70); after a preset time, the system is in a standby state (step 71); and when the hands are away from the photographic lens with the preset time passed, the device gives light or sound to inform the user; at this time, the system retrieves the object feature before the photographic lens, with the color of the feature quite different from that of the background, so as to avoid the embarrassment that the system cannot find out the center coordinate point of the feature object because the feature color and the background color are too similar (step 72).

Figure 5:
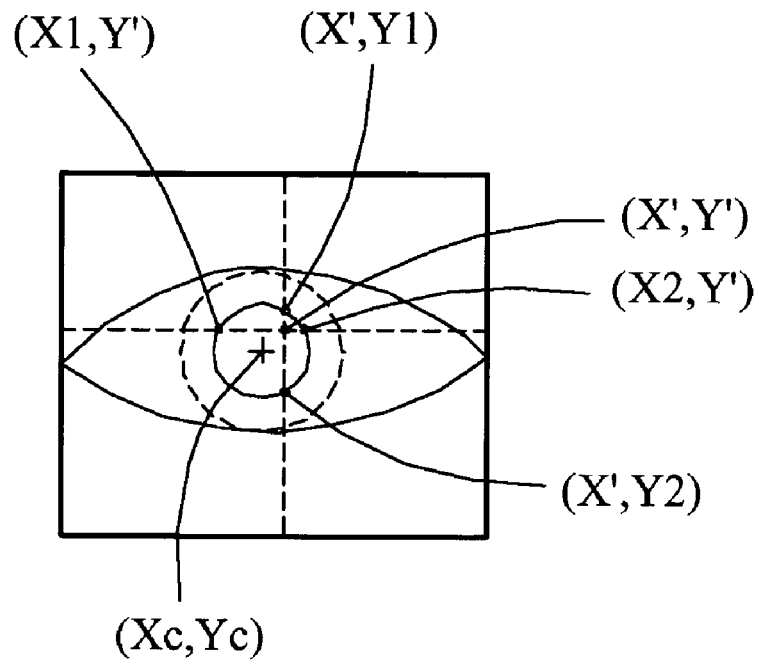
FIG. 5 is a first schematic view of the calculating process for the coordinate of the center point in accordance with the invention.

Also, refer to FIG. 5 for the implementation of the invention. Firstly, the target object image 21 is assumed to have been selected as the pupil image with a circular shape, and then a very important principle may be applied here. That is, since any perpendicular line (the normal line) at the center point of any tangent to the circle will pass the center of the pupil (the center of the circle), the intersection point of the normal lines of any two tangents must be the center of the circle. Taken from the perpendicular and horizontal lines, the two ends of the black object (organism feature, e.g. pupil or hair) are (X1, Y'), (X2, Y'), (X', Y1), (X', Y2), and the center point (Xc, Yc) of the pupil is acquired based on following formulas.

$$Xc=(X1+X2)/2$$

$$Yc=(Y1+Y2)/2.$$

Therefore, now we only have to ensure that the two lines X' and Y' will intersect with the pupil. Nowadays, the speed of the image input is about 12~30 frames per second. For the size of the images, as long as the center point of the pupil on X' and Y' is located at the same position as the previous center point of the pupil (Xc, Yc), the two lines will be assured to intersect with the pupil, and the error will not accumulate with the elapse of service time.

Figure 6:
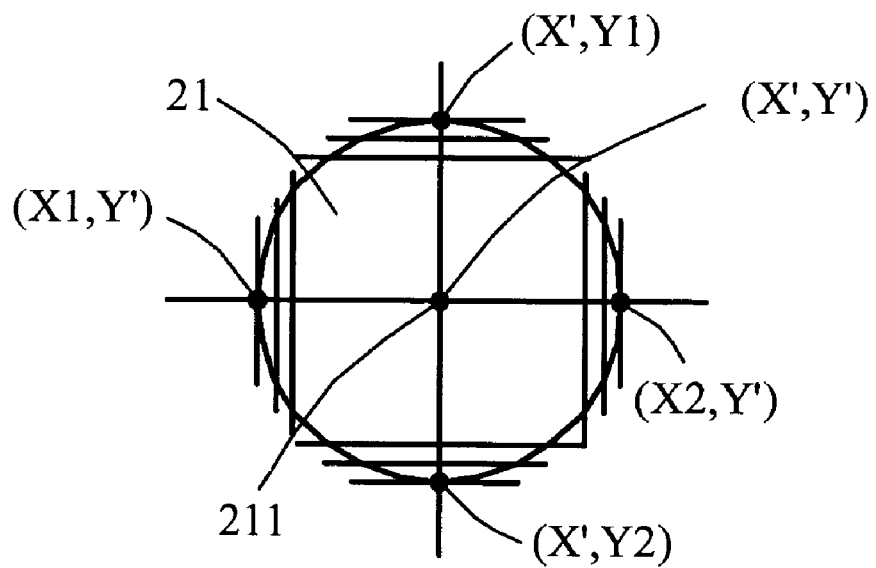
FIG. 6 is a second schematic view of the calculating process for the coordinate of the center point in accordance with the invention.

Secondly, as shown in FIG. 6, the system incorporates a methodology of edge searching between three lines, which employs the parallels of each tangent spaced apart from the tangents by a width of 5 pixels, to ensure that the obtained tangents are those on the edge of the circle; and the one dimensional coordinates of these two points are obtained, then we can find the coordinate of the center point 211 of the target object image 21, as shown in FIG. 6, and thus the reexamination is completed.

The coordinate of the center point (X', Y') in the figure is acquired based on below formulas.

$$X'=(X1+X2)/2$$

$$Y'=(Y1+Y2)/2$$

For another algorithm to get the coordinate of the center point, the position of the center point 211 of the target object image 21 (the feature object) is calculated as represented by the following formula (1):

$$(X_{Center}, Y_{Center}) = \left(\frac{1}{K}\sum_1^K X, \frac{1}{K}\sum_1^K Y\right) \quad (1)$$

Wherein, K is the total number of the gray values less than the threshold value retrieved after the dynamic binarization of the target object image 21; X is the x-coordinate of the point of the target object; Y is the y-coordinate of the point of the target object. Similarly, the coordinate of the center point 211 of the target object image 21 is obtained.

Figure 7:
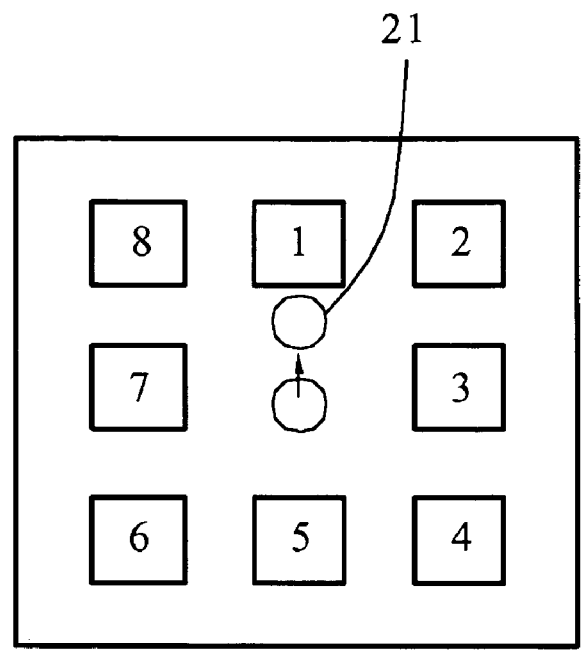
FIG. 7 is a schematic view of the movement along a specific path in accordance with the invention.

After finding the center point 211 of the target object image 21, the system of the invention proceeds to the validation process. At this time, the user has to move along a specific path according to the coordinates indicated by the system, as shown in FIG. 7, in order to validate whether the system has retrieved the feature object or not. If not, the system must return to the initial setting to retrieve the feature object once again.

In the aspect of searching for the target object (the pupil), first we adjust the proper binarization threshold value for the image input and at the same time calculate the coordinate of the center of the pupil, then activate the dynamic image search system and set up a dynamic image search frame 22 by taking the center coordinate $(X_c, Y_c)$ as the initial value (as shown in FIG. 8). Assume that the X-axis search range of the dynamic image search frame is $X_S$ and the Y-axis search range is $Y_S$, then the dynamic image search range is calculated to be within the four points $(X_c \pm X_s, Y_c \pm Y_s)$ by taking the coordinate of the pupil center as the center. When the pupil moves, calculate the next coordinate of the center point $(X_n, Y_n)$, and set up a new dynamic image search frame by taking $(X_n, Y_n)$ as the center, and then continue to search for and calculate the coordinate of the next center. The process cycles as such until the target to be searched in the dynamic search frame disappears or beyond the search range of the dynamic search frame (here the center set to be zero, i.e., $X_n=0$ and $Y_n=0$), then the system searches for the target over again, calculates the center coordinate of the target and then starts to set up another dynamic image search frame and continues to search for the next target center, and the process recycles so forth. Thus, the search range of the whole search frame $(R_{sX}, R_{sY})$ can be represented by the following formulas:

$$R_{sX} \in \begin{cases} (X_0, X_i) & \text{if } X_n = 0 \\ (X_c - X_s, X_c + X_s) & \text{if } X_n \neq 0 \end{cases}$$

$$R_{sY} \in \begin{cases} (Y_0, Y_i) & \text{if } Y_n = 0 \\ (Y_c - Y_s, Y_c + Y_s) & \text{if } Y_n \neq 0 \end{cases}$$

Wherein $X_0$, $Y_0$, $X_i$, and $Y_i$ represent the X-coordinate and Y-coordinate of the starting point and ending point of the initial search range respectively.

By calculating in conjunction with the dynamic image search principle, the system can maintain a better stability.

When the user moves along a specific path, if the movement coordinate point of the user has not reached the neighborhood of the coordinate point indicated by the system, the system will make a sound to notify the user that the current distance is still away from the requirement and further movement following the coordinate points indicated by the system is needed, and the user has to adjust the distance between the feature and the photographic lens appropriately. After the movement along a specific path, the system will make a 'beep' sound, which indicates that the step is completed (step 73).

If the validating process fails, i.e. the system fails to trace the organism feature or article feature effectively, the system will return to the initial setting, and the user repeats the step to enter the system over again.

Figure 9:
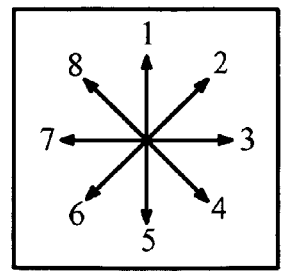
FIG. 9 is a schematic view of the codes of the eight regions in accordance with the invention.
Figure 10A:
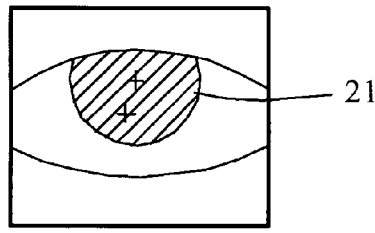
FIGS. 10A, 10B, 10C and 10D are schematic views of the codes of the location points of the target object respectively.
Figure 10B:
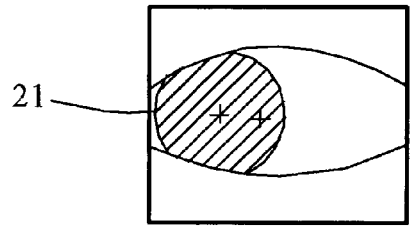
Figure 10C:
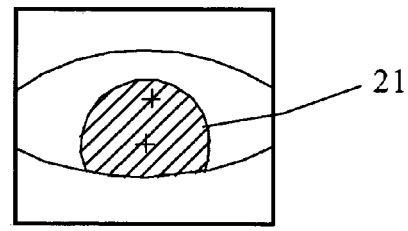
Figure 10D:
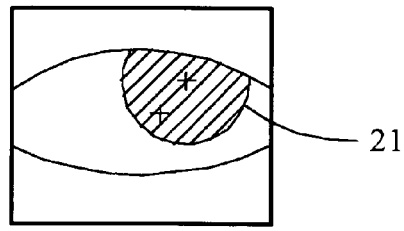
Figure 11:
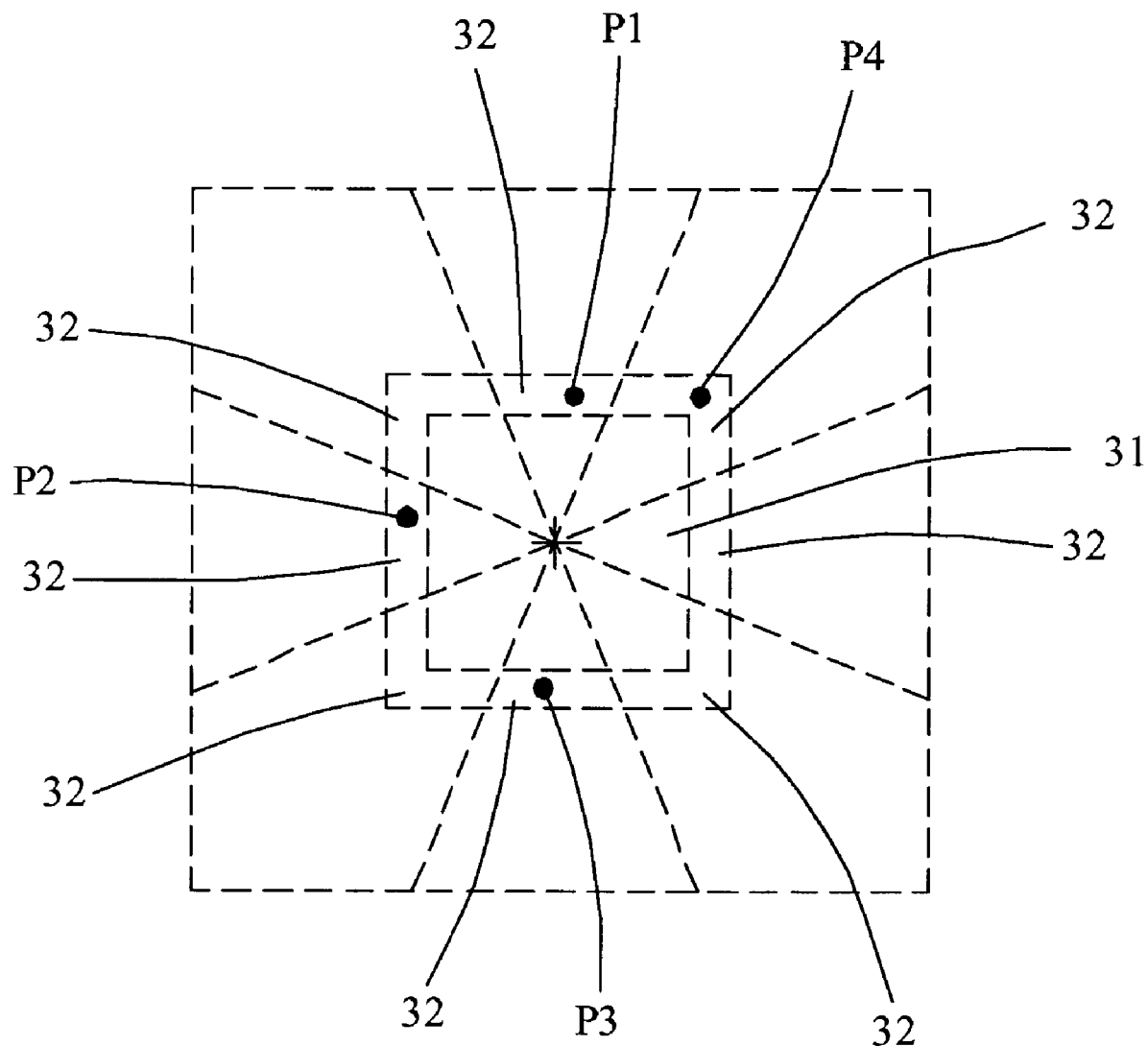
FIG. 11 is a schematic view of the encoding embodiment of the feature in accordance with the invention.

After the above validating process, the system proceeds to the encoding process, in which the system will trace the movement positions of the organism feature or the article feature (i.e. the target object image 21) to encode, and divide the movable region into eight positions. With regard to a 360° space, the region can be divided into 8 equal parts, and the angle of each position is 0°, 45°, 90°, 135°, 180°, 225°, 270° and 315°, with the angles corresponding to the numbers 1 to 8 as shown in FIG. 9. The collection of these numbers forms the user's password. The system must first set up a password database for the user, with the length of the password being predetermined to be 4 to 8 digits.

As shown in FIGS. 10A, 10B, 10C, 10D and 11, which are schematic views of the encoding utilizing the target object image 21 photographed, taking the pupil as the target object 20. According to the initial setting of the system, the feature needs to be at the center point of the photographic lens initially. Then, the user conduct encoding by moving the feature himself; here we only encode four codes, the order of which is above (1), left (7), below (5), top right (2) as shown in FIGS. 10A, 10B, 10C, and 10D respectively, and the center point positions of their target object image 21 are represented by P1, P2, P3, and P4 in FIG. 11. Therefore, a password '1752' is obtained.

Finally, a password validation device 60 is used to compare whether the password is the same as the correct one predetermined; and if yes, then to output a password-correct action, for example, computer or mobile phone booting, file open, system entry, gate lock unlocking, system entry of the ATM and the like.

The system initially assumes the feature object to be a black one (organism feature, e.g. pupil or hair). If it fails to lock the organism feature or the black pixels in the image middle region are too few, the system assumes the feature to be an article feature (e.g. the ring, signature pen, and decoration), then the central region (100×100 pixels) is set to be a 6×6 mask template and the article feature is defined by the template matching method of shape detection, and thereby the coordinate of the feature is obtained (step 74).

As for the aspect of the template matching method of shape detection, the shape and the area of the feature may be varied slightly or the system may mistake other feature as the predetermined feature due to the different movement positions. Therefore, the system will make some structural analysis according to the feature of the structure after the feature retrieving, and then perform the shape detection identification and matching according to the feature of the structure, while the template is regarded as a sub-image having an image structure and used for template matching. In this system, a 2-dimensional matrix with a 6*6 mask size is provided to search for the feature object before the photographic lens (the object to be detected). Once the feature object is found, it is matched with the feature object (the template) set by the system originally. During matching, the template moves in every region of the object to be detected, and the results of its convolution operation will be examined one by one. When there is a picture of the shape of the object to be detected in a certain region in the picture to be detected, the result of the convolution will be a great value, and by setting another tolerable threshold, the system determines that the object to be detected is the template of the database, the mathematical expression of which is shown as follows:

Assume that the image is f(x), and the template is g(x). First, we assume that g is fixed while image f changes as the template moves, that is to say, for the objects of the same shape, the shape and area of their features can be varied slightly due to the interference from the external environment, e.g. background colors, light sources or movement positions, and thus the value of $$\sum_{[i,j] \in R} fg$$

is great. In order to avoid this case, we employ normalized cross-correlation with $$C_{fg}[i, j] = \sum_{k=1}^{m} \sum_{l=1}^{n} g[k, l] f[i+k, j+l] \qquad (2)$$

And the mathematical expression of the template matching method can be modified as follows:

$$M[i, j] = \frac{c_{fg}[i, j]}{\left\{ \sum_{k=1}^{m} \sum_{l=1}^{n} f^2[i+k, j+l] \right\}^{1/2}} \qquad (3)$$

The mathematical expression of template matching method can also be represented as follows:

$$\max_{[i,j] \in R} |f - g|, \qquad (4)$$

or $$\sum_{[i,j] \in R} |f - g|. \qquad (5)$$

As for the value calculated by the above equations, the goodness of fit is greater when below a threshold.

In view of the above, the advantages and efficacies of the present invention can be summarized as following.

(1) Avoiding any contact. The present invention utilizes the movement positions of the pupil, head or article feature as password for entering a certain system (computer system) or entrance guard. In this system, the user does not need to make any contact such as inputting a password manually, contacting by using an identification magnetic card, or using a handheld key and so on.

(2) A novel password input mode. The present invention takes the positions of an organism or article feature as the basis of password input. Voice is not needed, and the disadvantage of overhearing is avoided; in addition, inputting by keyboard is not needed either, and thus the infection risk of the disease caused by touching other s' article is eliminated, and it is a great gospel for the limb-handicapped. The password input mode is quite novel.

(3) Effective anti-theft function. The present invention traces the positions of the specific organism or article feature as the input basis for password lock. In other words, the form of lock is no longer the combination of limited numbers and characters. With such a design, the previous trick of decoding a password by guessing the characters or numbers depending on the information related with the person who sets the password is no longer effective. Because the specific organism or article constituting the password varies, it is likely impossible to decode the password by computing a plurality of combinations of the characters and numbers with a computer, unless by taking the computer apart. Therefore, with such a set of password lock, an effective anti-theft function is achieved.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An image password lock system by tracing the position information of the organism or article features, comprising:
   a photographic device, for photographing a movable target object to read a dynamic image data having a predetermined shooting range set to be a whole-region image; the target object corresponds to a target object image; and the whole-region image has a central region and a plurality of specific password regions, wherein a number of the specific password regions is eight, respectively located above, top right of, right of, bottom right of, below, bottom left of, left of, top left of the central region, and represented by 1, 2, 3, 4, 5, 6, 7, and 8, respectively;
   a display device; and
   an image processing device, including:
      a calculation module of a center point of the target object, for calculating a center coordinate point of the target object image in the dynamic image data;
      a validation module of the target object movement, for outputting a password corresponding to one of the specific password regions, when the center point of the target object image moves toward one of the specific password regions from the central region and then back to the central region, wherein the validation module of the target object movement outputs a warning action to indicate that the specific password region has not been reached when the center point of the target object image moves toward but still away from the specific password region;
      a password display module, for displaying the password output on the display device; and
      a password validation device, for comparing whether the password is the same as a predetermined correct password, where when the password is the same as the predetermined correct password, outputs a password-correct action.

2. The image password lock system by tracing the position information of the organism or article feature of claim 1, wherein the password is formed by moving a feature of the target object to each of the specific password regions.

3. The image password lock system by tracing the position information of the organism or article feature of claim 2, wherein the feature of the target object is selected from the group consisting of an organism feature and an article feature.

4. The image password lock system by tracing the position information of the organism or article feature of claim 3, wherein the organism feature is selected from the group consisting of an pupil of an user, and an head of the user.

5. The image password lock system by tracing the position information of the organism or article feature of claim 3, wherein the organism feature is initially set to a black object.

6. The image password lock system by tracing the position information of the organism or article feature of claim 5, wherein the organism feature is selected from the group consisting of an pupil of an user, and an head of the user.

7. The image password lock system by tracing the position information of the organism or article feature of claim 3, wherein when locking the organism feature fails due to a plurality of black pixels in the central region are few, the central region is set to be a 6×6 mask template and the article feature is defined by a template matching method of a shape detection, thereby obtaining a coordinate of the article feature.

8. The image password lock system by tracing the position information of the organism or article feature of claim 7, wherein the article feature is selected from the group consisting of a ring, a signature pen, and a decoration.

9. The image password lock system by tracing the position information of the organism or article feature of claim 1, wherein an up/down direction and a left/right moving direction of the dynamic image data read by a photographic chip of the photographic device corresponds to an up/down direction and a left/right moving direction of the user.

10. The image password lock system by tracing the position information of the organism or article feature of claim 9, wherein the photographic device is a charge coupled device.

11. The image password lock system by tracing the position information of the organism or article feature of claim 1, wherein when a photographic lens of the photographic device is shielded with a hand to start an initial setting of the image password lock system, when the photographic lens has shielded with the hand for a preset time, the image password lock system is in a standby state, and when the hand is away from the photographic lens with the preset time passed, the photographic device outputs an indicating signal to inform an user and retrieves a feature of the target object before the photographic lens, where the target object has a distinct color from a background to avoid that calculating the center coordinate point of the target object fails.

12. The image password lock system by tracing the position information of the organism or article feature of claim 11, wherein the indicating signal is selected from the group consisting of a light and a sound.

13. The image password lock system by tracing the position information of the organism or article feature of claim 1, further comprising: a device for making a sound to notify a user that the user moves following a coordinate points indicated by the image password lock system when a movement coordinate point of the user has not reached a neighborhood of the coordinate point.

14. An image password lock system by tracing the position information of the organism or article features, comprising:
   a photographic device, for photographing a movable target object to read a dynamic image data having a predetermined shooting range set to be a whole-region image; the target object corresponds to a target object image; and the whole-region image has a central region and a plurality of specific password regions;
   a display device; and
   an image processing device, including:
      a calculation module of a center point of the target object, for calculating a center coordinate point of the target object image in the dynamic image data;
      a validation module of the target object movement, for outputting a password corresponding to one of the specific password regions, when the center point of the target object image moves toward one of the specific password regions from the central region and then back to the central region;
      a password display module, for displaying the password output on the display device; and
      a password validation device, for comparing whether the password is the same as a predetermined correct password, where when the password is the same as the predetermined correct password, outputs a password-correct action,
   wherein the feature of the target object is selected from the group consisting of an organism feature and an article feature, and when locking the organism feature fails due to a plurality of black pixels in the central region are few, the central region is set to be a 6×6 mask template and the article feature is defined by a template matching method of a shape detection, thereby obtaining a coordinate of the article feature.

15. An image password lock system by tracing the position information of the organism or article features, comprising:
   a photographic device, for photographing a movable target object to read a dynamic image data having a predetermined shooting range set to be a whole-region image; the target object corresponds to a target object image; and the whole-region image has a central region and a plurality of specific password regions;
   a display device; and
   an image processing device, including:
      a calculation module of a center point of the target object, for calculating a center coordinate point of the target object image in the dynamic image data;
      a validation module of the target object movement, for outputting a password corresponding to one of the specific password regions, when the center point of the target object image moves toward one of the specific password regions from the central region and then back to the central region;
      a password display module, for displaying the password output on the display device; and
      a password validation device, for comparing whether the password is the same as a predetermined correct password, where when the password is the same as the predetermined correct password, outputs a password-correct action,
   wherein when a photographic lens of the photographic device is shielded with a hand to start an initial setting of the image password lock system, when the photographic lens has shielded with the hand for a preset time, the image password lock system is in a standby state, and when the hand is away from the photographic lens with the preset time passed, the photographic device outputs an indicating signal to inform an user and retrieves a feature of the target object before the photographic lens, where the target object has a distinct color from a background to avoid that calculating the center coordinate point of the target object fails.

* * * * *

UNITED STATES PATENT AND TRADEMARK OFFICE
CERTIFICATE OF CORRECTION

PATENT NO. : 7,599,525 B2 Page 1 of 1
APPLICATION NO. : 11/205145
DATED : October 6, 2009
INVENTOR(S) : Lin et al.

It is certified that error appears in the above-identified patent and that said Letters Patent is hereby corrected as shown below:

On the title page delete Item (73) and insert

Item --(73)   CHUNG SHAN INSTITUTE OF SCIENCE AND TECHNOLOGY, Taoyuan County, Taiwan, R.O.C.--

Signed and Sealed this

Sixteenth Day of March, 2010

David J. Kappos
*Director of the United States Patent and Trademark Office*